US011824640B2

(12) United States Patent
Devaraj et al.

(10) Patent No.: US 11,824,640 B2
(45) Date of Patent: Nov. 21, 2023

(54) SYSTEM AND METHOD FOR RECONFIGURING A NETWORK USING NETWORK TRAFFIC COMPARISIONS

(71) Applicant: HEWLETT PACKARD ENTERPRISE DEVELOPMENT LP, Houston, TX (US)

(72) Inventors: Sasindran Devaraj, Bangalore (IN); Nikhil Shrishail Soragavi, Bangalore (IN); Edward Muniswamy Victor Vajravelu, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/223,638

(22) Filed: Apr. 6, 2021

(65) Prior Publication Data
US 2021/0399947 A1    Dec. 23, 2021

(30) Foreign Application Priority Data

Jun. 17, 2020  (IN) .............................. 202041025539

(51) Int. Cl.
*H04L 41/0816* (2022.01)
*H04L 43/0882* (2022.01)
(Continued)

(52) U.S. Cl.
CPC .......... *H04L 41/0816* (2013.01); *H04L 12/18* (2013.01); *H04L 43/0882* (2013.01);
(Continued)

(58) Field of Classification Search
CPC . H04L 41/0816; H04L 12/18; H04L 43/0882; H04L 61/1511; H04L 47/125;
(Continued)

(56) References Cited

U.S. PATENT DOCUMENTS 6,584,501 B1 *  6/2003  Cartsonis ................ H04L 43/00
                                                          709/224
9,071,541 B2 *  6/2015  Atlas ........................ H04L 45/24
(Continued)

FOREIGN PATENT DOCUMENTS

CN    104283979 A  *  1/2015  ............. H04L 12/18
CN    109981819 A  *  7/2019
(Continued)

OTHER PUBLICATIONS

Kaiser, D. et al., "A Multicast-Avoiding Privacy Extension for the Avahi Zeroconf Daemon," NetSys 2015: International Conference on Networked Systems, http://kops.uni-konstanz.de/bitstream/handle/123456789/31809/Kaiser_0-299586.pdf?sequence=3.
(Continued)

*Primary Examiner* — Kamal B Divecha
*Assistant Examiner* — Alex H. Tran
(74) *Attorney, Agent, or Firm* — Hewlett Packard Enterprise Patent Department

(57) ABSTRACT

Example implementations relate to a method for reconfiguring a network based on network traffic comparison. The first network supports multicast Domain Name Service (mDNS) query with multicast query-response messages. The method includes determining a client type for each client device and a first average packet count for each client type in a first network. The method includes receiving a second average packet count for each corresponding client type from a second network. The second network supports mDNS query with unicast query-response messages. A difference between the first average packet counts and the second average packet counts for corresponding client types is computed. The first network is reconfigured to respond to mDNS query with unicast query-response messages when the difference computed for at least one client type in the
(Continued)

first network and each corresponding client type in the second network is above a predefined threshold.

20 Claims, 6 Drawing Sheets

(51) Int. Cl.
*H04L 12/18* (2006.01)
*H04L 61/4511* (2022.01)
*H04L 47/125* (2022.01)
*H04L 47/80* (2022.01)

(52) U.S. Cl.
CPC ........ *H04L 61/4511* (2022.05); *H04L 47/125* (2013.01); *H04L 47/801* (2013.01); *H04Q 2213/242* (2013.01)

(58) Field of Classification Search
CPC ... H04L 47/801; H04L 61/1541; H04L 41/22; H04L 12/1886; H04L 41/16; H04L 12/1877; H04Q 2213/242; H04W 4/06
See application file for complete search history.

(56) References Cited

U.S. PATENT DOCUMENTS

| | | | |
|---|---|---|---|
| 2010/0128645 A1* | 5/2010 | Lin | H04W 52/0225 370/311 |
| 2015/0229584 A1* | 8/2015 | Okamoto | H04L 12/5692 709/226 |
| 2015/0363209 A1* | 12/2015 | Uchida | H04L 12/2818 713/2 |
| 2018/0123901 A1* | 5/2018 | Yermakov | H04L 43/0894 |
| 2018/0191600 A1 | 7/2018 | Hecker et al. | |
| 2019/0149460 A1 | 5/2019 | Andrews et al. | |
| 2019/0182060 A1* | 6/2019 | Simotas | H04B 7/14 |
| 2019/0319883 A1 | 10/2019 | Zhou | |
| 2020/0044957 A1 | 2/2020 | Allan | |
| 2021/0126894 A1* | 4/2021 | Warrick | H04L 61/4541 |
| 2021/0201118 A1* | 7/2021 | Chen | G06N 3/08 |

FOREIGN PATENT DOCUMENTS

| | | | | |
|---|---|---|---|---|
| EP | 2933985 A1 | | 10/2015 | |
| WO | WO-2006036563 A2 | * | 4/2006 | ....... A61F 13/15756 |
| WO | WO-2015003566 A1 | * | 1/2015 | ............. H04L 12/18 |
| WO | WO-2015047335 A1 | * | 4/2015 | ............. H04W 4/06 |
| WO | WO-2016175872 A1 | * | 11/2016 | ........... H04L 12/462 |
| WO | WO-2017023998 A1 | * | 2/2017 | ............. H04L 67/16 |

OTHER PUBLICATIONS

Alissa Irei, "NetInsight enables proactive network performance monitoring", Jan. 21, 2019, TechTarget, 1 page.
Aruba Networks, "Configuring AirGroup on Instant," Apr. 11, 2018, <https://web.archive.org/web/20180411221012/http://www.arubanetworks.com/techdocs/InstantWenger_Mobile/Advanced/Content/AirGroup/Configuring_AirGroup_on_.htm#EnablingorDisablingAirGroup>, 4 pages.
Aruba Networks, "Introducing AirGroup", <https://web.archive.org/web/20180424124030/http://www.arubanetworks.com/techdocs/InstantWenger_Mobile/Advanced/Content/AirGroup/AirGroup.htm>, Apr. 24, 2018, 1 page.
Hewlett Packard Enterprise Development LP, "Aruba Netinsight", Data Sheet, 2018, 3 pages.
Hewlett Packard Enterprise Development LP, "Aruba Netinsight," Jul. 3, 2017, QuickSpecs, 4 pages.
Lemon et al., "Multicast DNS Discovery Relay draft-ietf-dnssd-mdns-relay-00", Network Working Group, Internet-Draft, Nov. 11, 2018, pp. 1-48.

* cited by examiner

SYSTEM AND METHOD FOR RECONFIGURING A NETWORK USING NETWORK TRAFFIC COMPARISIONS

BACKGROUND

Domain Name System-Service Discovery (DNS-SD) is a zero-configuration (Zeroconf) networking protocol that allows client devices (e.g., mobile devices, tablets, smartphones, etc.) to browse a network for available services using standard DNS messages. For instance, DNS-SD allows a client device to use DNS query and query-response messages to discover a named list of services available on hosts (e.g., client devices, servers, etc.) in a network and resolve those services to hostnames.

Moreover, client devices may use the multicast DNS (mDNS) protocol in conjunction with DNS-SD to send DNS query messages to multiple hosts in a network. The mDNS protocol may be used to resolve hostnames to IP addresses in networks that do not include a local name server (e.g., DNS server).

BRIEF DESCRIPTION OF THE DRAWINGS

Various examples will be described below with reference to the following figures.

Figure 1:
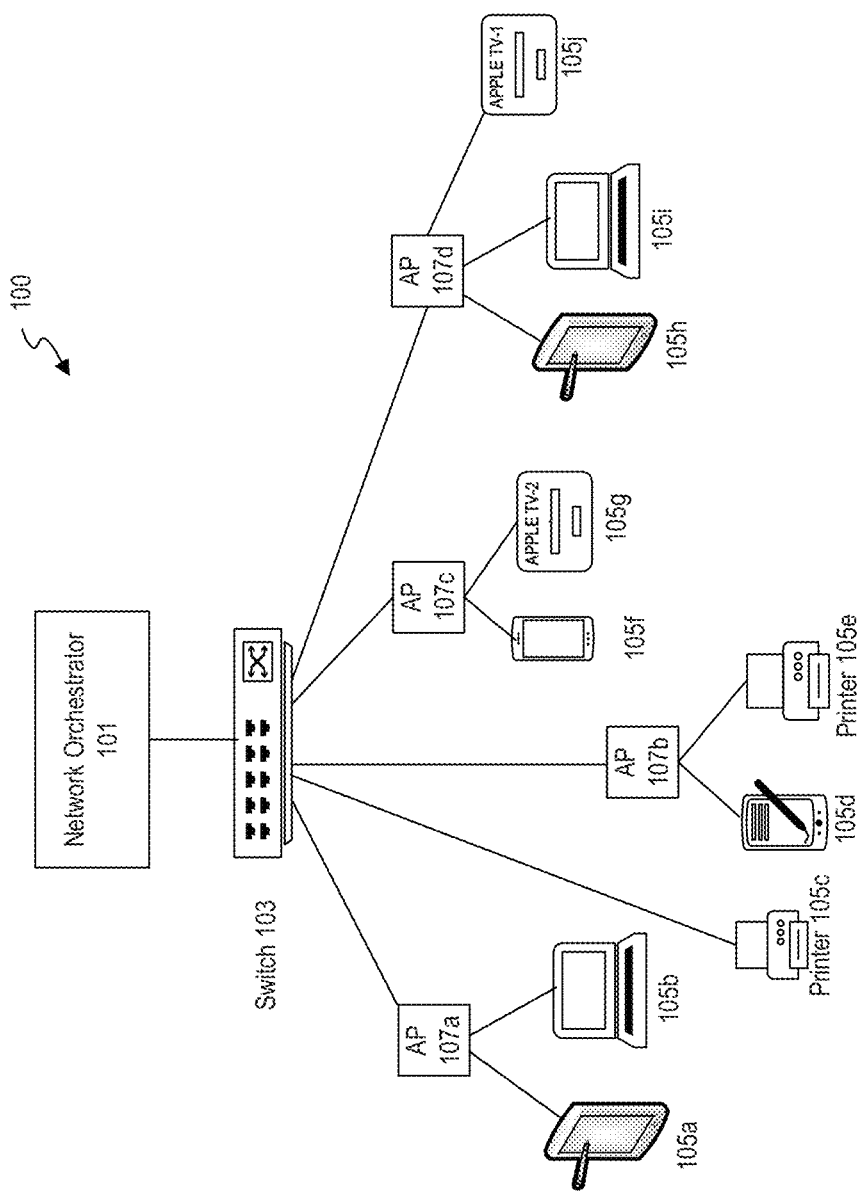
FIG. 1 is an exemplary network environment to reconfigure a network using network traffic comparisons.

The drawings provide examples and/or implementations consistent with the description; however, the description is not limited to the examples and/or implementations provided in the drawings.

DETAILED DESCRIPTION

The following detailed description refers to the accompanying drawings. Wherever possible, the similar reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing example embodiments only and is not intended to be limiting. As used herein, the singular forms "a," "an," and "the" are intended to include the plural forms as well, unless the context clearly indicates otherwise. The term "plurality," as used herein, is defined as two, or more than two. It will also be understood that, although the terms first, second, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

As discussed above, client devices may use DNS-SD in conjunction with mDNS to discover available services on a network. For instance, a client device may send an mDNS query message with a specific service name to all hosts in a network. When a host having the service identified by the specific service name receives the mDNS query message, the host responds by sending an mDNS query-response message that resolves its hostname to one or more IP addresses. However, since the mDNS query message is also sent to every other host in the network, each host responds with an mDNS query-response message even if it does not offer the service identified by the specific service name. This results in flooding of mDNS query-response messages across the network and high bandwidth utilization, which in turn, may cause users to fail to discover network services (e.g., services provided by printers, displays, media servers, etc.), network outages, and/or reduced overall user experience when accessing network services. Such flooding is especially problematic for large-scale networks (e.g., campus or enterprise networks) having a large number of client devices. Moreover, with the proliferation of BYOD (Bring Your Own Device) policies for many large-scale networks, each user may add several client devices to the network, leading to an additional load of mDNS query messages and mDNS query-response messages and high bandwidth utilization. The additional load of mDNS query-response messages may reduce the overall user experience. For instance, the user may need to send multiple mDNS query messages to connect to a specific service-providing host, which in turn, increases the time it takes for the user to connect to the desired network service.

In general, embodiments disclosed herein describes a method and system for reconfiguration of a network using network traffic comparisons. Embodiments disclosed herein may comprise determining a client type for each of a plurality of client devices in the first network. Examples disclosed herein may comprise determining a first average packet count for each client type connected to the first network, wherein the first network is configured to respond to a mDNS query with multicast query-response messages, and receiving a second average packet count for each client type of a plurality of client devices connected to a second network, wherein the second network is configured to respond to a mDNS query with unicast query-response messages.

Embodiments disclosed herein may comprise computing, for each client type in the first network, a difference between the first average packet count of the client type with the second average packet count of a corresponding client type in the second network. Embodiments described herein may comprise, based on the difference between the first average packet count and the second average packet count being above a predefined threshold for at least one client type of the first network, reconfiguring the first network to respond to mDNS query with unicast query-response messages.

In this manner, embodiments described herein reconfigure a network using network traffic comparisons. For instance, embodiments disclosed herein determine a first average packet count for each client type in a first network that is configured to respond to a mDNS query with multicast query-response messages, receive a second average packet count for each corresponding client type connected to a second network that is configured to respond to a mDNS query with unicast query-response messages, and compute, for each client type in the first network, a difference between the first average packet count of the client type with the second average packet count of a corresponding client type in the second network, thereby determining that the first network is configured in a manner (i.e., configured to respond to a mDNS query with multicast query-response messages) which may result in flooding of mDNS query messages and mDNS query-response messages. Moreover, embodiments disclosed herein may comprise, based on the difference between the first average packet count and second average packet count for at least one client type of the first network being above a predefined threshold, reconfiguring the first network to respond to mDNS query with unicast query-response messages, thereby reconfiguring the first network to prevent flooding of mDNS query and mDNS query-response messages.

In embodiments disclosed herein, the networks being compared (e.g., the first network and the second network) may have similar number(s) and type(s) of client devices. The networks may be customer broadcast networks deployed by the same cloud service provider. The client devices on each network may include both client devices requesting for services and client devices providing specific services. To compare the networks, a network orchestrator maintains a list of connected client devices and network devices in each network to be compared. The network orchestrator may comprise an external server or any suitable network device. Each client device is categorized as a specific client type. Further, the network orchestrator receives the network traffic in the form of average packet count for each client type from the networks to be compared. The device compares a first average packet count for each client type in a first network that is configured to respond with conventional mDNS query-response messages to a second average packet count of a similar client type in a second network that is configured to respond with unicast query-response messages. The second network implementing unicast query-response messages may have a lower average packet count and overall lower bandwidth utilization in comparison to the first network implementing a standard mDNS query/response mechanism, since mDNS query messages and mDNS query-response messages are not flooded across all network devices. The results of the comparison can be provided by the network orchestrator to a network administrator of the first network. In an embodiment, based on the results of the network traffic comparison, the network orchestrator may provide the network administrator of the first network with a recommendation to reconfigure the first network with a unicast query-response mechanism. In another embodiment, based on the results of the network traffic comparison, the network orchestrator can be configured to reconfigure the first network to respond to mDNS query messages with unicast query-response messages instead of the conventional mDNS query-response messages.

Exemplary Network Environment

FIG. 1 is an exemplary network environment in which the embodiments of the present disclosure can be implemented. FIG. 1 shows an exemplary network environment 100 that includes a network orchestrator 101, a switch 103, access points 107(*a-d*) and connected client devices 105(*a-j*). The client devices includes service seeking devices and service providing devices such Apple@ TV-1 105*g*, Apple® TV-2 105*j*, printers 105*c* and printer 105*e*.

The network orchestrator 101 configures and manages the client devices (105 *a-j*) and network devices (e.g., access points 107*a-d*, switch 103, etc.) connected to a network 100. The network orchestrator 101 includes at least one processing resource and at least one machine-readable storage medium comprising (e.g., encoded with) instructions that are executable by the at least one processing resource of the network orchestrator 101 to implement functionalities described herein. In addition, the network orchestrator 101 may engage in any network data transmission operations, including, but not limited to, switching, routing, bridging, or a combination thereof. Moreover, the network orchestrator 101 may gather network operating information from various nodes of one or more networks, including network traffic load information, network topology information, network usage information, etc. Furthermore, the network orchestrator 101 may transmit commands to various nodes of the one or more networks to alter network topology and routing to achieve various network efficiency and efficacy goals. Moreover, the network orchestrator 101 may comprise one or more cloud-based resources (e.g., a cloud server). Moreover, the network orchestrator 101 may include any necessary hardware components to perform the inventions disclosed herein, including, but not limited to: processors, memories, display devices, input devices, communications equipment, etc.

The switch 103 is configured to create Virtual LANs (Local Area Networks), wherein each VLAN defines a broadcast domain for a set of connected client devices 105(*a-j*). In FIG. 1, each of the access points 107(*a-d*) are part of a single VLAN. Although the network environment depicted in FIG. 1 shows ten client devices 105(*a-j*) connected to the network 100 in a VLAN, it will be understood that any suitable number(s) of client devices may be connected to the network 100. For instance, in a campus or enterprise environment implementing BYOD policies, the number of the client devices in the VLAN may be much more (e.g., hundreds, thousands, etc.). Similarly, although only a single access point is shown in each VLAN, it will be understood that multiple access points may be present in one or more VLANs of the network. Further, although only access points 107(*a-d*) are depicted in FIG. 1 to be connected to switch 103, it will be understood that any suitable type(s) and number(s) of network devices (e.g., switches, controllers, access points, routers, etc.) may be connected to switch 103.

In the example of FIG. 1, the client device 105*b* sends across an mDNS query message to access a printer service provided by printer device 105*c* connected to the network 100. An mDNS query message is transmitted to all connected client devices 105(*a-j*). The printer device 105*c* receives the mDNS query message and responds back with an mDNS query-response message. Besides the printer 105*c* for which the query message was intended, all the other client devices 105 also receive the mDNS query message and respond back with mDNS query-response messages. This may result in a large number of mDNS query-response messages which get flooded across the network devices in the first network, thereby increasing the overall bandwidth consumption. Although FIG. 1 shows that the client devices 105(*a-j*) use mDNS based query-response messages, it will be understood that other protocols may also be used. For example, client devices 105(*a-j*) may use Digital Living Network Alliance (DLNA) to discover network services.

Figure 2:
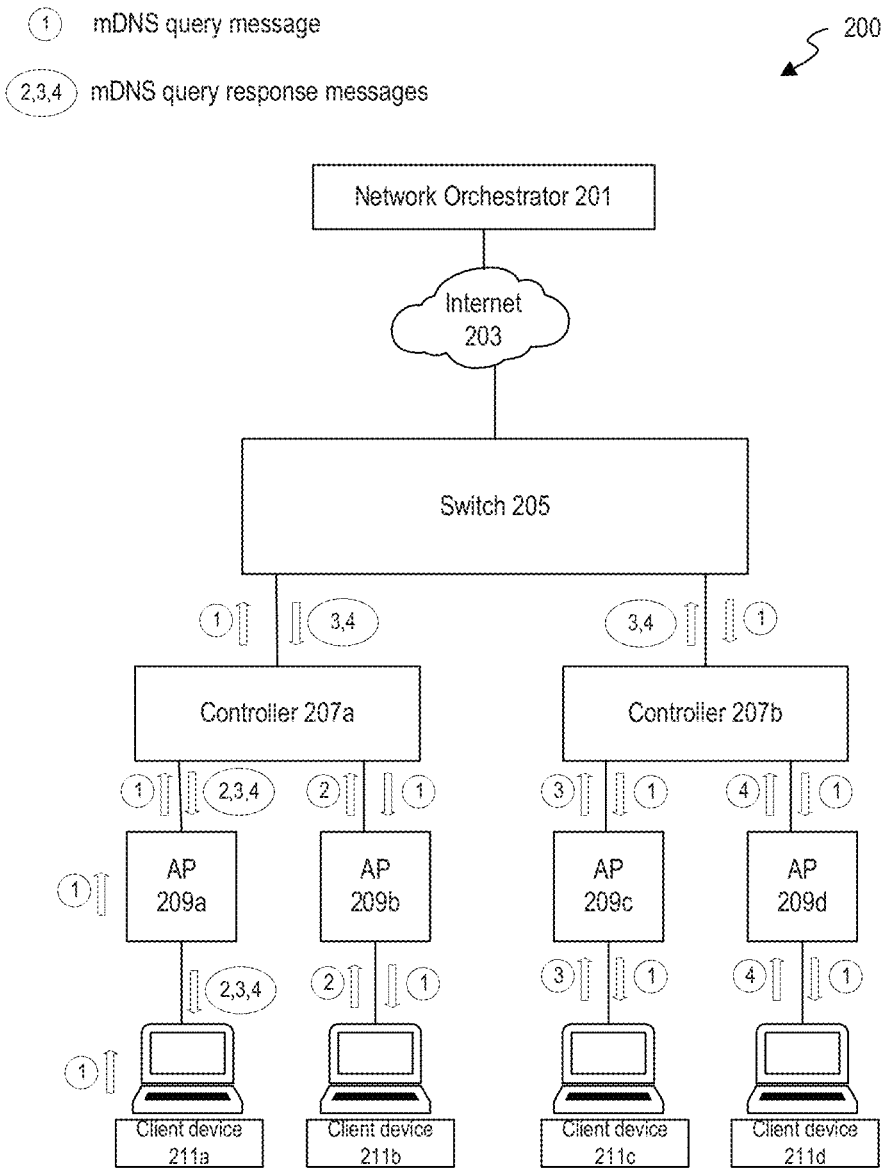
FIG. 2 is an example first network, in accordance with embodiments of the present disclosure.

FIG. 2 is an example first network 200, in accordance with embodiments of the present disclosure. FIG. 2 shows a first network 200 which is configured to support conventional mDNS query-response messages. The first network 200 includes a network orchestrator 201, a switch 205, controllers 207(*a, b*), access points 209(*a-d*) and four client devices 211(*a-d*) connected via respective access points (209*a*-209*d*). In an embodiment, the network orchestrator 201 comprises an external server. In another embodiment, the network orchestrator 201 may be any network device configured to manage multiple networks for a single service provider. The network orchestrator 201 maintains a list of all the connected client devices on the first network 200. Each client device 211(*a-d*) in the first network 200 comprises client device information that is registered with the network orchestrator 201. The client devices includes the four client devices 211(*a-d*). The switch 205 creates VLANs on the first network 200. The controller 207*a* and controller 207*b* are used for defining the VLANS for the connected client devices. The network orchestrator 201 determines a client type for each connected client device 211(*a-d*) based on the vendor specific attributes present in the mDNS query received from each client device in the first network 200. The vendor specific attributes may include vendor name, model number, version number, and any other unique vendor attribute. For example, the type of client device 211(*a-d*) may be an Apple® iPhone, Apple® MacBook, an Android® phone, a media server, a printer, a scanner, a camera, or any other such device. The network orchestrator 201 determines the average packet count (i.e., first average packet count) for each client type in the first network (100). The network orchestrator 201 can be configured to monitor each type of client device 211(*a-d*), and to monitor the packets sent by each client type for a period of time for determining a first average packet for each client type in the first network 200. The monitoring of the network devices, client devices 211 (*a-d*) and the packets sent by each client device in the first network 200 can be performed over a day, month or even a year. It will be understood that the monitoring of the network devices and client devices in the network 200 can be performed for any suitable period(s) of time. Although FIG. 2 shows that the network orchestrator 201 manages only client devices 211(*a-d*) and network devices in the first network 200, it will be understood that multiple networks (not shown in FIG. 2) may be managed by the network orchestrator 201.

FIG. 2 depicts a conventional mDNS query/response mechanism in the first network 200. The client device 211*a* sends an mDNS query message to all the connected client devices 211(*a-d*) in the first network 200 and receives mDNS query-response message from all the connected client devices in the first network 200.

Table 1 below shows exemplary information gathered by network orchestrator 201 for each client type. Although FIG. 2 shows four client devices connected to four access points, it will be understood that any suitable numbers of client devices and access points can be present in the first network 200.

TABLE 1

Client device list in network 200

| Client Type | Average packet count per minute | Average packet size (in bytes) |
|---|---|---|
| Client type 1 | 500 | 1080 |
| Client type 2 | 400 | 900 |
| Client type 3 | 140 | 890 |

Figure 3:
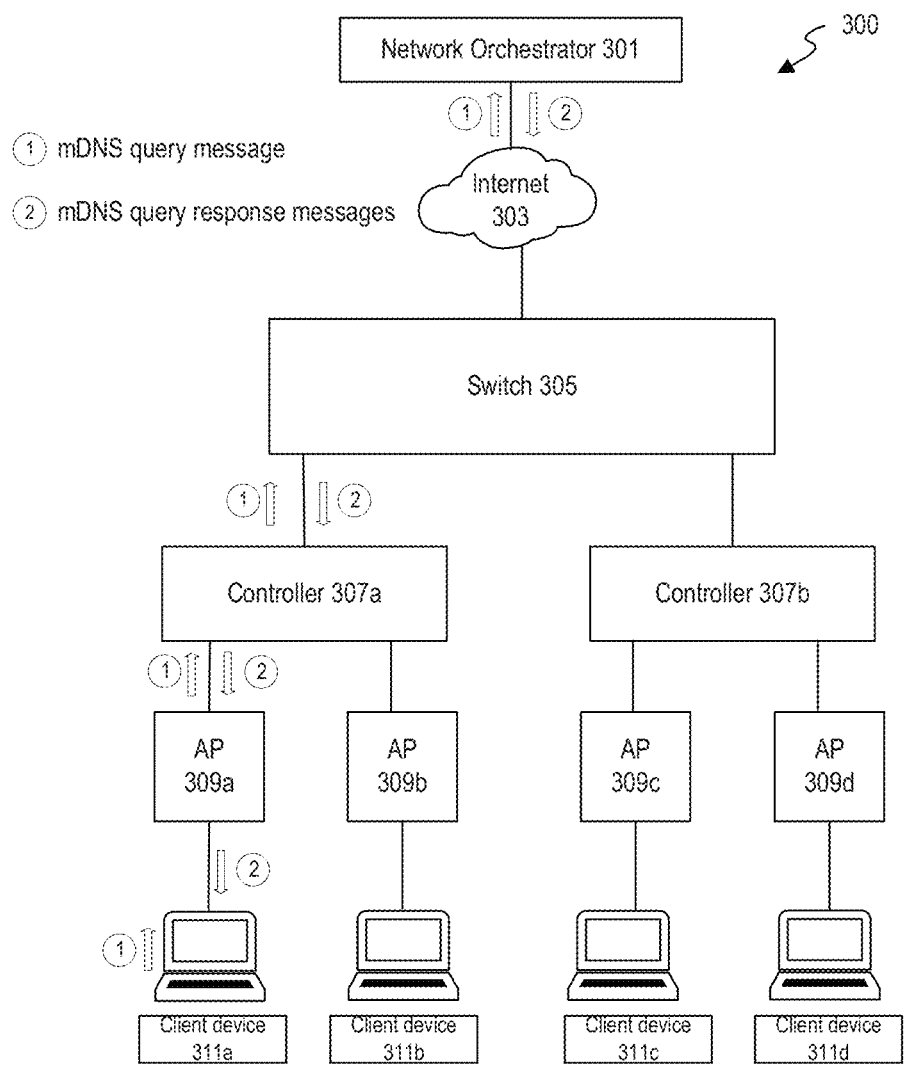
FIG. 3 is an example second network, in accordance with embodiments of the present disclosure.

FIG. 3 is an example second network 300, in accordance with embodiments of the present disclosure. FIG. 3 shows a second network 300 which is configured to support a modified mDNS query/response mechanism with unicast query and query-response messages. The second network 300 includes a network orchestrator 301, a switch 305, controllers 307(*a, b*), access points 309(*a-d*) and four client devices 311(*a-d*) connected via respective access points (309*a*-309*d*). In an embodiment, the network orchestrator 301 comprises an external server. The network orchestrator 301 maintains a list of all the connected client devices on the second network 300. Each client device 311(*a-d*) in the second network 300 comprises client device information that is registered with the network orchestrator 301. The switch 305 creates VLANs on the second network 300. The controller 307*a* and controller 307*b* are used for defining the VLANS for the connected client devices. For example, the type of client device 311(*a-d*) may be an Apple@ iPhone, an Apple® MacBook, an Android® phone, a media server, a printer, a scanner, a camera or any other such device. The network orchestrator 301 determines a client type for each connected client device 311(*a-d*) based on the vendor specific attributes present in the mDNS query received from each client device in the second network 300. The vendor specific attributes may include vendor name, model number, version number, and any other unique vendor attribute. The network orchestrator 301 determines the average packet count (i.e., second average packet count) for each client type in the second network 300. In an embodiment, a single network orchestrator is configured to manage the client devices and network devices of both the first network 200 and second network 300. In an embodiment, the network orchestrator 201 may be an external server configured to support the operations of the first network 200 and second network 300. In an embodiment, the external server may be managed by a service provider of the first network 200 and second network 300.

The components of FIG. 3 are similar to FIG. 2. The primary difference between the first network 200 (in FIG. 2) and the second network 300 (in FIG. 3) is the modified mDNS query/response mechanism in the second network 300. The client device 311*a* sends an mDNS query message which is unicast to network orchestrator 301 via the controller 307*a*. The network orchestrator 301 is in communication with a proxy device (not shown) maintaining all the services provided by client devices 311(*a-d*) in the second network 300. In an embodiment, the controller 307*a* can be configured to provide unicast query-response messages. The network orchestrator 301 may configure a network device (e.g., controller 307*a*) to convert the mDNS query message to a unicast query message. The controller 307*a* receives the mDNS query message and unicasts the query-response message to the proxy device in communication with the network orchestrator 301. Based on the information of the service providing devices at the proxy device, a unicast query-response message is sent back to the client device 311*a* via the controller 307*a*. As all the query-response messages are unicast query-response messages, there is no flooding of the mDNS query-response messages at all network devices across the second network 300. The network orchestrator 301 determines the second average packet count for each client type and sends across the second average packet count for each client type to the network orchestrator 301.

Table 2 below shows exemplary information gathered by network orchestrator 301 for each client type.

TABLE 2

Client devices list in network 300

| Device Type | Average packet count per Minute | Average packet size (in Bytes) |
|---|---|---|
| Client type 1 | 50 | 1080 |
| Client type 2 | 40 | 900 |
| Client type 3 | 120 | 1020 |
| Client type 4 | 14 | 890 |

Figure 4:
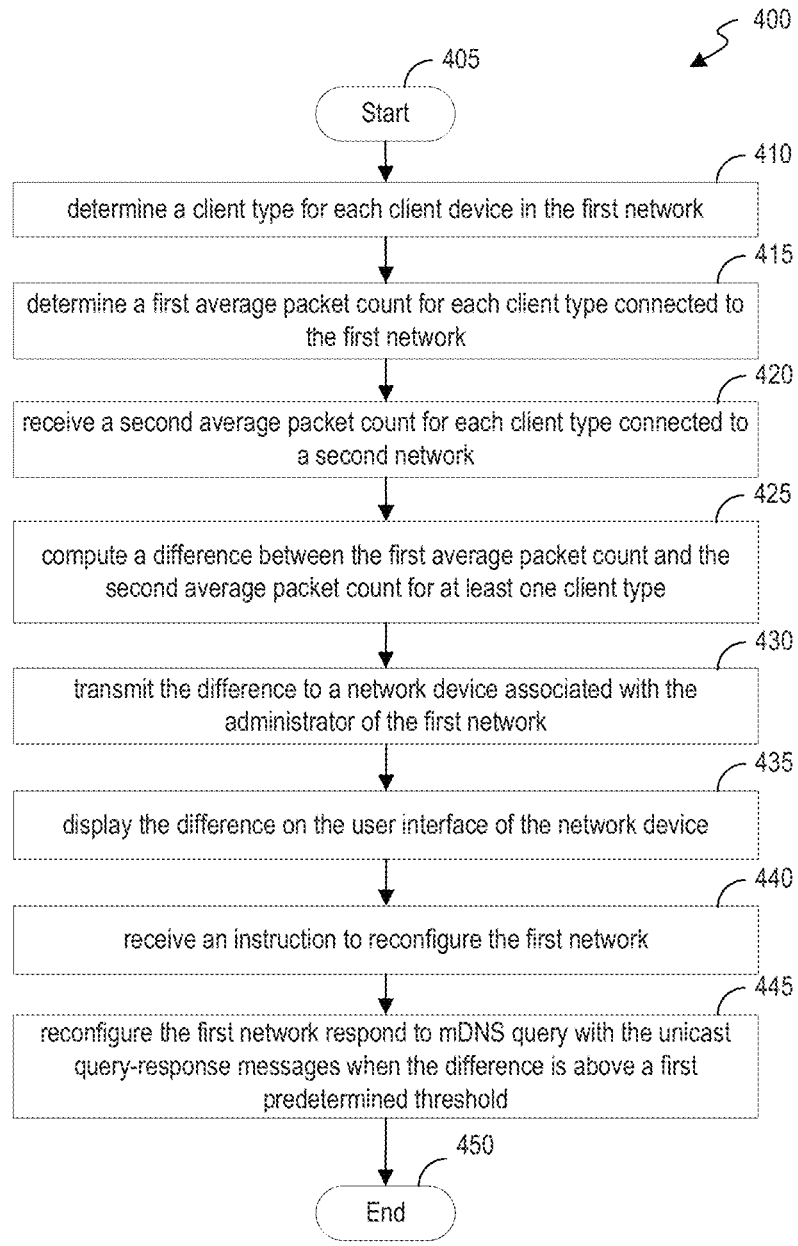
FIG. 4 is a flow diagram depicting a first method of reconfiguring a network using network traffic comparisons, in accordance with embodiments of the present disclosure.

FIG. 4 is a flow diagram depicting a first method 400 of reconfiguring the first network 200 using network traffic comparisons in accordance with embodiments of the present disclosure. The first method 400 is executed by the network orchestrator 201.

First method 400 may start in block 405 and continue to block 410, where the network orchestrator 201 determines a client type for each connected client device 211(a-d) in the first network 200. The mDNS query message received from a client device contains vendor specific attributes based on which the network orchestrator 201 can determine the client type for each connected client device 211(a-d) in the first network 200. The vendor specific attributes may include vendor name, model number, version number, and any other unique vendor attribute. In block 415, the network orchestrator 201 determines a first average packet count for each client type 211 in the first network 200. The network orchestrator 201 monitors each type in the first network 200 along with the packets sent by each client type for a period of time and determines a first average packet for each client type.

In block 420, the network orchestrator 201 receives a second average packet count for each client type connected to a second network 300. The network orchestrator 301 of the second network 300 can be configured to determine the second average packet count of each client type in the second network 300 and send the second average packet count(s) of the client type(s) to the network orchestrator 201 of the first network 200. The network orchestrator 301 maintains a list of client types from the connected client devices 311(a-d) and monitors the packets sent by each client type in the second network 300. Based on this information, the network orchestrator 301 determines the second average packet count of each client type in the second network 300 and sends the second average packet count(s) of the client type(s) to the network orchestrator 201 of the first network 200.

In block 425, the network orchestrator 201 computes a difference between the first average packet count and the second average packet count for at least one client type in the second network 300. This difference is computed for each of first network 200. In some examples, the client types used for computing the difference between first average packet count in the first network 200 and the second average packet count in the second network 300 may be identical client types. For example, a client type in the first network 200 and a corresponding client type in the second network 300 may each be an Apple@ iPhone 11. Alternatively, in some examples, the client types used for computing the difference between first average packet count in the first network 200 and the second average packet count in the second network 300 may be similar client types, but not identical client types. For example, suppose that a client type in the first network 200 is an Amazon® Fire TV Stick 1$^{st}$ generation device, and a client type in the second network 300 is an Amazon® Fire TV Stick 2$^{st}$ generation device. In such example, although the client type in the first network 200 is not identical to the client type of the second network 300, these client types may be considered to be similar client types (and thereby corresponding client types) because both devices are streaming devices. In an embodiment, two client types may be determined to be corresponding client types based on a pre-defined mapping of model numbers, version numbers, functions, etc., of the client devices.

In block 430, the differences are transmitted to a client device 211 associated with the network administrator of the first network 200 and the difference is displayed on a user interface of the client device 211 at block 435. The differences include the difference between the first average packet count of a client type in the first network 200 and second average packet count for each corresponding client type in the second network 300 for each of the client types connected to the first network 200. Thus, the network administrator can see the differences in the first average packet counts and the second average packet counts for different client types. Based on the difference between the first average packet count and second average packet count for each client type in the first network 200, the network administrator can decide if the first network 200 should be reconfigured to respond with unicast query-response messages. In an embodiment, the network orchestrator 201 determines if the difference between the first average packet count and the second average packet count for each client type in the first network 200 is above a first predefined threshold. Based on (e.g., in response to) a determination that the difference between the first average packet count and the second average packet count for at least one client type in the first network 200 is above the first predefined threshold, the network orchestrator 201 may send instructions to indicate to a network administrator (e.g., display on a user interface of client device 211) that the difference between the first and second average packet counts for at least one client type is above the first predefined threshold. Moreover, the network orchestrator 201 may send instructions to indicate to the network administrator (e.g., display on a user interface of client device 211) the difference between the first and second average packet counts for at least one client type of the first network 100 along with the first predefined threshold. In an embodiment, the first predefined threshold may be based on a difference between the first average packet count of a single client type in the first network 200 and the second average packet count for a corresponding client type in the second network 300. In another embodiment, the first predefined threshold may be based on the difference between the first average packet counts of multiple client devices in the first network 200 and second average packet counts of corresponding client types in the second network 300.

At block 440, the network orchestrator 201 receives an instruction (e.g., from the administrator) to reconfigure the first network 200 to respond to mDNS query message with unicast query-response messages. In an embodiment, when the difference in first average packet count and second average packet count for at least one client type in the first network 200 is above the first predefined threshold, the network orchestrator 201 may receive the instruction to reconfigure the first network 200 to respond to mDNS query with unicast query-response messages.

At block 445, based on the received instruction, the network orchestrator 201 reconfigures the first network 200 to respond to mDNS query with unicast query-response messages. In an embodiment, when the difference between the first average packet count of at least one client type in the first network 200 and the second average packet count for each corresponding client type in the second network 300 computed at block 425 is above the first predefined threshold, the network orchestrator 201 reconfigures the first network 200 to respond to mDNS query with unicast query-response messages. Although the execution of the first method 400 above is described below with reference to the network orchestrator 201, other devices such as an external server may perform the functions of the network orchestrator 201. The external server may be managed by service provider of the first network 200 and the second network 300.

Consider an example of client type 1 shown in Table 1 and Table 2. The client type 1 is an Apple® MacBook in both the first network 200 and second network 300. As shown in Table 1 associated with the first network 200, the first average packet count for each Apple® MacBook (client type 1) is 500. As shown in Table 2 associated with the second network 300, the second average packet count for each Apple® MacBook(client type 1) is 50. The difference between the first average count and second average packet count is 450 average packet counts per minute. Thus, network orchestrator 210 determines that there is a 90% difference in the first average packet count and second average packet count for the Apple® MacBook between the first network 200 and the second network 300. In an embodiment, the network orchestrator 201 can be configured to reconfigure the first network 200 to support unicast query-response messages when the difference between the first average packet count and second average packet count for Apple® MacBook (client type 1) is greater than 60%. The network orchestrator 201 may reconfigure to support unicast query-response messages as the difference between the first average packet count and the second average packet count is greater than 60%.

In an embodiment, the first predefined threshold is based on a difference between the first average packet count for a single client type in the first network 200 and the second average packet count for a single corresponding client type in the second network 300, and a percentage difference between the first average packet count and the second average packet count may be used for setting the first predefined threshold. For example, the first threshold percentage of can be set for 50%. In such example, when the difference between the first average packet count and the second average packet count is greater than 50%, the network orchestrator 201 may be configured to reconfigure the first network 200 to support unicast query-messages.

In another embodiment, the first predefined threshold is based on a difference between the first average packet counts of multiple client types in the first network 200 and the second average packet counts for corresponding multiple client types in the second network 200, and a percentage difference between the first average packet counts and the second average packet counts may be used for determining the first predefined threshold. For example, the first threshold percentage of can be set for 50%. In such example, when the difference between the first average packet counts of multiple client types of the first network 200 and the second average packet counts of corresponding client types in the second network 300 is greater than 50%, the network orchestrator 201 may reconfigure the first network 200 to support unicast query-messages.

Figure 5:
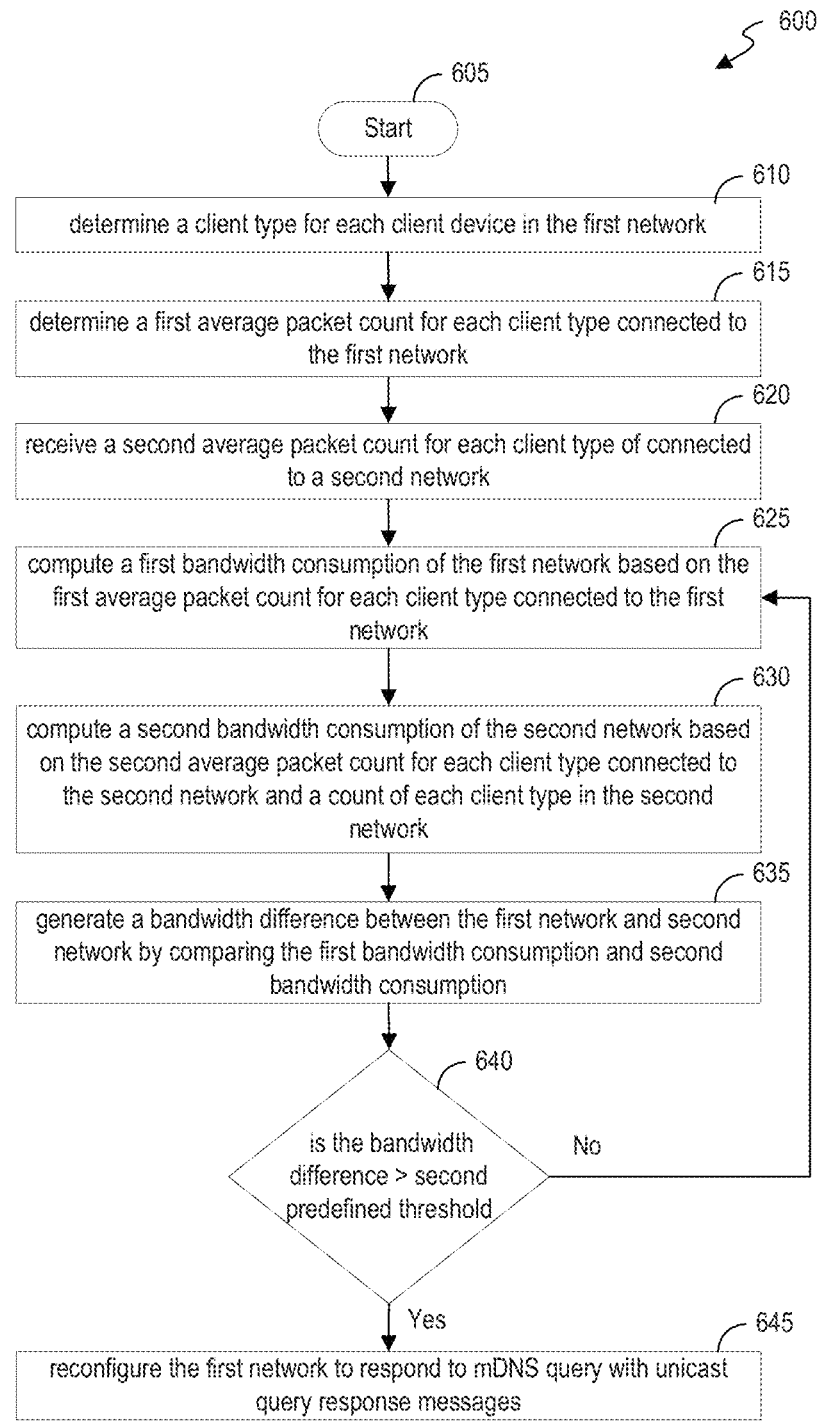
FIG. 5 is a flow diagram depicting a second method of reconfiguring a network using network traffic comparisons, in accordance with embodiments of the present disclosure.

FIG. 5 is a flow diagram depicting a second method 500 of reconfiguring the first network 200, in accordance with embodiments of the present disclosure. The second method 500 is executed by the network orchestrator 201. Second method 500 may start in block 505 and continue to block 510, where the network orchestrator 201 determines a client type for each client device 211 in the first network 200. The network orchestrator 201 maintains a list of all the connected client devices on the first network 200. The mDNS query message received from a client device contains vendor specific attributes. Based on the vendor specific attributes present in the mDNS query message from each of the client device in the first network 200, the network orchestrator 201 can determine the client type for each connected client device 211(a-d) in the first network 200. The vendor specific attributes may include vendor name, model number, version number and any other unique attribute of the client type.

In block 515, the network orchestrator 201 determines a first average packet count for each client type 211 connected to the first network 200. The network orchestrator 201 monitors each type of client device in the first network 200 along with the packets sent by each client type for a period of time and calculates a first average packet count for each client type in the first network 200.

In block 520, the network orchestrator 201 receives a second average packet count for each client type connected to the second network 300. The network orchestrator 301 of the second network 300 can be configured to send the second average packet count of each client type to the network orchestrator 201. The network orchestrator 301 maintains a list of client type from the connected client devices and monitors the packets sent by each client type. Based on this information, the network orchestrator 301 determines the second average packet count for each client type in the second network 300 and sends it to the network orchestrator 201 of the first network 200.

In block 525, the network orchestrator 201 computes a first bandwidth consumption of the first network 200 based on the first average packet count for each client type connected to the first network 200. To compute the first bandwidth consumption of the first network 200, the network orchestrator 201 determines the first average packet count of each client type, the count of client devices 211 of each client type, and the count of network devices 209 sharing the same VLAN with the client devices 211.

Bandwidth Consumption in the First Network 200

In examples disclosed herein, a bandwidth consumption in the first network 200 may correspond to a bandwidth used by each client type in the first network 200 and may be computed according to Equation 1 below: Equation 1: Bandwidth used by each client type=client type count*client type packet count*packet length of the client type*count of network devices sharing the same VLAN.

In some examples, the bandwidth consumption for each client type is calculated to compute the overall bandwidth consumption of the first network 200. When the first network 200 implements a conventional mDNS query-response messages, the mDNS query-response messages are multicast, which may lead to flooding of mDNS query-response messages over the network devices in the first network 200.

Bandwidth Consumption in the Second Network 300

In block 530, based on the received second average packet count for each client type in the second network 300, the network orchestrator 201 computes a second bandwidth consumption of the second network 300. In an embodiment, the network orchestrator 201 receives the second bandwidth consumption for the second network 300 from the network orchestrator 301.

In examples disclosed herein, a second bandwidth consumption of the second network 300 may correspond to a bandwidth used by each client type in the second network 300 and may be computed according to Equation 2 below:

Bandwidth used by each client type=client type count*client type packet count*packet length of the client type.  Equation 2:

The bandwidth for each client type is calculated to compute the overall bandwidth consumption of the second network 300. The network devices are not considered while computing the bandwidth for the second network 300 as the mDNS query-response message are not multicast. In an embodiment, the network orchestrator 301 can be configured to compute the overall second bandwidth consumption and transmit it to the network orchestrator 201.

Bandwidth Savings:

In block 535, the device computes a bandwidth difference between the first network 200 and second network 300 by comparing the first bandwidth consumption and second bandwidth consumption. In an embodiment, the bandwidth difference highlights the extra bandwidth utilized by the first network 200 because of implementing the conventional mDNS query-response messages. Thus, the first network 200 can save this extra bandwidth if it is reconfigured to respond to mDNS query messages with unicast query-response messages. An example of the bandwidth comparison and bandwidth savings is shown below.

The bandwidth comparison and difference determines the total bandwidth saving which can achieved in the first network 200 if it is reconfigured for a unicast query-response messages. In an embodiment the bandwidth difference is computed in the form of a bandwidth saving percentage of the second network 300 over the first network 200, according to Equation 3 below:

$$\text{Bandwidth savings \%} = \left(\frac{\sum_{X*n} - \sum_{Y}}{\sum_{X*n}}\right) * 100 \quad \text{Equation 3}$$

Where X=bandwidth used by client type connected in the first network 200;
X1, X2 . . . Xn=bandwidth of different client types connected in the first network 200;
Y=bandwidth used by client type connected in the second network 300;
Y1, Y2 . . . Yn=bandwidth of different client types connected in the second network 300; and
n=number of network devices sharing the same VLAN.

In block 540, the network orchestrator 201 transmits the bandwidth difference to an external server managed by the administrator responsible for management and configuration of the first network 200. In an embodiment, the bandwidth savings which can be achieved if the first network 200 is reconfigured to respond to mDNS query with unicast query-response messages can be provided to the network administrator in the form of a recommendation.

In block 545, the bandwidth difference is displayed on the user interface of the external server managed by the administrator responsible for management and configuration of the first network 200. In another embodiment, the bandwidth difference can be transmitted and displayed on a client device associated the administrator of the first network 200.

In another embodiment, the bandwidth savings as a percentage can be displayed on the user interface. The network administrator can decide if the wants to reconfigure the first network 200 to respond to the mDNS query with unicast query-response messages. In an embodiment, the recommendations can be highlighted based on the percentage savings. For example, if the bandwidth savings is less than 25%, the bandwidth savings is displayed as a recommendation on the user interface with an orange highlight. If the bandwidth savings is 25% to 50% the bandwidth savings is displayed as a recommendation on the user interface with a red highlight. If the bandwidth savings is greater than 50% the bandwidth savings is displayed as a recommendation on the user interface with a thick red highlight. It will be understood by one skilled in the art that recommendations based on bandwidth savings may be displayed on a user interface using any suitable graphical element(s) (e.g., highlights, colors, etc.) and based on any suitable bandwidth savings percentage(s).

In an embodiment, the first network 200 and second network 300 are customer broadcast networks deployed by the same service provider.

The network orchestrator 201 may be a server receiving network traffic information from the first network 200 and the second network 300. The server may compare the network traffic of similarly sized networks. The client devices in the second network 300 are considered to have ideal average packet counts as the second network 300 is configured to response to mDNS query with unicast query-response messages. In an embodiment, the server can be configured to compare the network traffic of the first network 200 with the second network 300 when the count of at least one client type in the first network 200 and the count of each corresponding client type in the second network 300 is identical. Based on a determination that there is a difference in count of at least one client type in the first network 200 and count of each corresponding client type in the second network 300, the server can be configured to increase/decrease the count of each corresponding client type in the second network 300 based on the count of the at least one client type in the first network 200. This may be performed before computing the second average packet count for the at least one corresponding client type. Further, in case there is a client type in the first network 200 which does not have a corresponding client type in the second network 300, the server can be configured to determine a second average packet count for a corresponding client type in another network.

In addition, the server may compute the respective first bandwidth consumption and second bandwidth consumption based on the first average packet count and second average packet count for each client type in the first network 200. Moreover, the network orchestrator 201 may compute the bandwidth difference between the first bandwidth consumption and the second bandwidth consumption. The bandwidth difference reflects the savings in bandwidth which can be achieved by the first network 200 if it is reconfigured to support unicast query-response message. Furthermore, the bandwidth savings may be transmitted to the network administrator of first network 200.

In an embodiment, if the first network 200 is a new network deployed by a service provider, the service provided can compute and transmit bandwidth savings to the network administrator of the first network 200 as a recommendation by comparing the bandwidth consumption of the first network 200 with the bandwidth consumption of the second network 300. The administrator of the first network 200 may be provided with different recommendations based on the range of bandwidth savings. The network administrator may try reconfiguring the first network 200 based on the recommendations received from the service provider and determine if the bandwidth savings is required/beneficial to the first network 200. In an embodiment, based on the bandwidth savings, the administrator can set a predefined threshold for the bandwidth savings above which the network 200 may be reconfigured to support unicast query-response messages.

In block 550, the network orchestrator 201 determines if an instruction to reconfigure the first network 200 is received. If an instruction to reconfigure the first network 200 is received, the network orchestrator 201 reconfigures the first network 200 to respond to mDNS query message with unicast query-response messages in block 555. In an embodiment, the network orchestrator can 201 may transmit an instruction to a network device in the first network 200 to implement the unicast query-response messages. For example, a controller 207a in the first network 200 can be reconfigured to support unicast query-response messages. If no instructions are received, the second method 500 may stop.

Although the execution of the second method 500 above is described above with reference to the network orchestrator 201, other devices such as an external server managed by service provider of the network 200 may be used for execution of second method 500.

Figure 6:
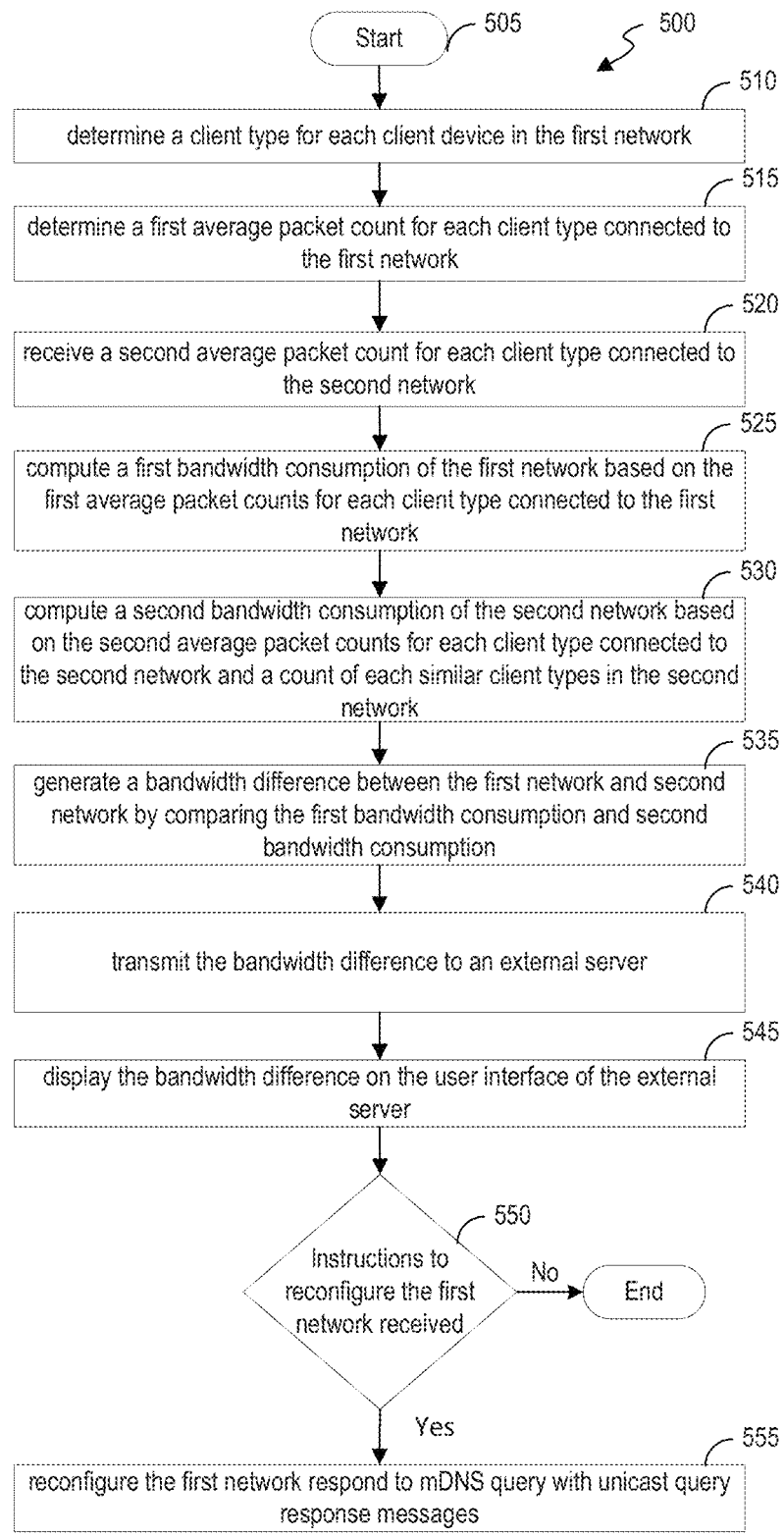
FIG. 6 is a flow diagram depicting a third method of reconfiguring a network using network traffic comparisons, in accordance with embodiments of the present disclosure.

FIG. 6 is a flow diagram depicting a third method 600 of reconfiguring the first network 200, in accordance with embodiments of the present disclosure. The third method 600 follows the same steps as method 500 until the calculation of the bandwidth difference in block 635. In block 640, the network orchestrator 201 can be configured to determine if the bandwidth difference is greater than a second predefined threshold. The network administrator of the first network 200 can determine this second predefined threshold and send it to the network orchestrator 201. The network administrator may want to reconfigure the first network only if the bandwidth difference is substantial. For example, the network orchestrator 201 can be provided with the bandwidth difference percentage as the second predefined threshold. In an embodiment, the second predefined threshold can be 40%. In such example, network administrator may want to reconfigure the first network 200 only if there is a 40% difference in bandwidth between first network 200 and second network 300.

In block 645, the first network 200 is reconfigured when the bandwidth difference is above the second predefined threshold. In an embodiment, the second predefined threshold is set by the administrator of the first network 200 based on a percentage of the bandwidth savings required.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed is:

1. A method, comprising:
   determining, by a processing resource, a client type for each of a plurality of client devices connected to a first network, wherein the first network comprises the plurality of client devices connected to the first network via a first network controller connected to the processing resource;
   determining, by the processing resource, a first average packet count for each client type connected to the first network, wherein the first network is configured to send a first multicast Domain Name Service (mDNS) query to all of the plurality of client devices connected to the first network, with each client device of the plurality of client devices responding to the first mDNS query using a multicast query-response message;
   determining, by the processing resource, a second client type for each of a plurality of second client devices connected to a second network, wherein the second network comprises the plurality of second client devices connected to the second network via a second network controller coupled to the processing resource;
   receiving, by the processing resource, a second average packet count for each client type of the plurality of second client devices connected to the second network, wherein the second network is configured to unicast a second mDNS query to the second network controller, the second network controller configured to respond to the second mDNS query using a corresponding unicast query response message;
   computing, by the processing resource for each client type in the first network, a difference between the first average packet count of the client type in the first network and the second average packet count for a corresponding client type in the second network; and
   reconfiguring the first network based on a determination that the difference between the first average packet count and the second average packet count for at least one client type of the first network and a corresponding at least one client type of the second network is above a first predefined threshold and based on an instruction sent by a network administrator of the first network,
   wherein reconfiguring the first network causes the first network to unicast the first mDNS query to the first network controller and configure the first network controller to respond to the first mDNS query using a corresponding unicast query response message,
   wherein when the instruction to reconfigure the first network is received, reconfiguring the first network controller in the first network to support unicast query and response messages,
   wherein the processing resource monitors the first network, the second network and maintains a list of all the connected client devices in the first network and the second network.

2. The method of claim 1, wherein reconfiguring the first network further comprising:
   transmitting the difference to a network device associated with the network administrator of the first network;
   receiving the instruction from the network device associated with the network administrator to reconfigure the first network to unicast the first mDNS query to the first network controller; and
   in response to the receiving the instruction, reconfiguring the first network to unicast the first mDNS query to the first network controller.

3. The method of claim 2, wherein the method further comprises displaying the difference on a user interface of the network device associated with the administrator of the first network.

4. The method of claim 1, wherein reconfiguring of the first network further comprising:
   computing, by the processing resource, a first bandwidth consumption of the first network based on the average packet count for each client type connected to the first network, wherein the bandwidth consumption for each client type connected to the first network is computed based on the first average packet count of each client type in the first network, a count of each client type in the first network, and a number of network devices sharing a VLAN with the plurality of client devices;

computing, by the processing resource, a second bandwidth consumption of the second network based on the second average packet count for each client type connected to the second network and a count of each client type in the second network;

generating, by the processing resource, a bandwidth difference between the first network and second network by comparing the first bandwidth consumption and second bandwidth consumption; and reconfiguring the first network based on a determination that the bandwidth difference is above a second predefined threshold.

5. The method of claim 4, wherein the method further comprises displaying the bandwidth difference on a user interface of a network device associated with the network administrator of the first network.

6. The method of claim 4, wherein the method further comprises displaying the bandwidth difference on a user interface of an external server configured for managing the first network.

7. The method of claim 4, wherein the method further comprises the steps of:
computing a bandwidth savings of the first network based on the bandwidth difference between the first network and the second network;
transmitting the bandwidth savings as a recommendation to the network device associated with the network administrator of the first network; and
displaying the recommendation on the user interface of the network device.

8. The method of claim 1, wherein the first network and the second network are customer broadcast networks.

9. A network orchestrator, comprising:
at least one hardware processor; and a non-transitory computer readable storing instructions that when executed by a hardware processor cause the hardware processor to:
determine a client type for each of a plurality of client devices in a first network, wherein the first network comprises the plurality of client devices connected to the first network via a first network controller connected to the processing resource;
determine a first average packet count for each client type connected to the first network, wherein the first network is configured to send a first multicast Domain Name Service (mDNS) query to all of the plurality of client devices connected to the first network, with each client device of the plurality of client devices responding to the first mDNS query using a multicast query-response message;
determine a second client type for each of a plurality of second client devices connected to a second network, wherein the second network comprises the plurality of second client devices connected to the second network via a second network controller connected to the processing resource;
receive a second average packet count for each client type of the plurality of second client devices connected to the second network, wherein the second network is configured to unicast a second mDNS query to the second network controller, the second network controller configured to respond to the second mDNS query using a corresponding unicast query response message;

compute, for each client type in the first network, a difference between the first average packet count of the client type in the first network and the second average packet count for corresponding client type in the second network; and reconfigure, the first network based on a determination that the difference between the first average packet count and the second average packet count for at least one client type of the first network and a corresponding at least one client type of the second network is above a first predefined threshold and based on instruction sent by a network administrator of the first network, wherein reconfiguring the first network causes the first network to unicast the first mDNS query to the first network controller and configure the first network controller to respond to the first mDNS query using a corresponding unicast query response message, wherein when the instruction to reconfigure the first network is received, reconfigure the first network controller in the first network to support unicast query and response messages, wherein the hardware processor monitors the first network, the second network and maintains a list of all the connected client devices in the first network and the second network.

10. The network orchestrator of claim 9, wherein the instructions when executed by the hardware processor causes the hardware processor to:
transmit, the difference to a network device associated with the network administrator of the first network;
receive, the instruction from the network device to reconfigure the first network to unicast the first mDNS query to the first network controller; and
in response to receiving the instruction, reconfigure the first network to unicast the first mDNS query to the first network controller.

11. The network orchestrator of claim 9, wherein the instructions when executed by the hardware processor causes the hardware processor to:
compute a first bandwidth consumption of the first network based on the first average packet count for each client type connected to the first network, wherein the bandwidth consumption for each client type connected to the first network is computed based on the first average packet count of each client type in the first network, a count of each client type in the first network, and a number of network devices sharing a VLAN with the plurality of client devices;
compute a second bandwidth consumption of the second network based on the second average packet count for each client type connected to the second network and a count of each client type in a second network;
generate a bandwidth difference between the first network and second network by comparing the first bandwidth consumption and second bandwidth consumption; and
reconfigure the first network to unicast the first mDNS query to the first network controller based on a determination that the bandwidth difference is above a second predefined threshold.

12. The network orchestrator of claim 9, wherein the instructions when executed by the hardware processor causes the hardware processor to display the bandwidth difference on a user interface of a network device associated with an administrator of the first network.

13. The network orchestrator of claim 9, wherein the first network and the second network are customer broadcast networks.

14. The network orchestrator of claim 11, wherein the instructions when executed by the hardware processor causes the hardware processor to:
compute a bandwidth savings of the first network based on the bandwidth difference between the first network and the second network;
transmit the bandwidth savings as a recommendation to a network device associated with the network administrator of the first network; and
display the recommendation on the user interface of the network device.

15. The network orchestrator of claim 14, wherein the second predefined threshold is set based on a percentage of the bandwidth savings of the first network.

16. A method, comprising:
determining, by a processing resource, a client type for each of a plurality of client devices in the first network and a count of network devices sharing the first network with the plurality of client devices, wherein the first network comprises the plurality of client devices connected to the first network via a first network controller connected to the processing resource;
determining, by the processing resource, a first average packet count for each client type connected to the first network, wherein the first network is configured to send a first multicast Domain Name Service (mDNS) query to all of the plurality of client devices connected to the first network, with each client device of the plurality of client devices responding to the first mDNS query using a multicast query-response message;
determining, by the processing resource, a second client type for each of a plurality of second client devices connected to a second network, wherein the second network comprises the plurality of second client devices connected to the second network via a second network controller coupled to the processing resource;
receiving, by the processing resource, a second average packet count for each client type of the plurality of client devices connected to the second network, wherein the second network is configured to unicast a second mDNS query to the second network controller, the second network controller configured to respond to the second mDNS query using a corresponding unicast query response message;
computing, by the processing resource for each client type connected to the first network, a first bandwidth consumption of the client type in the first network, wherein the first bandwidth consumption of the client type is computed based on the first average packet count of the client type, a count of the plurality of client devices of the client type, and a number of network devices sharing a VLAN with the plurality of client devices of the client type;
computing, by the processing resource, a second bandwidth consumption of the second network based on a second average packet count for each client type connected to the second network and a count of each client type in the second network;
generating, by the processing resource, a bandwidth difference between the first network and second network by comparing the first bandwidth consumption and second bandwidth consumption; and
reconfiguring, by the processing resource, the first network based on the bandwidth difference and an instruction sent by a network administrator of the first network,
wherein reconfiguring the first network causes the first network to unicast the first mDNS query to the first network controller and configure the first network controller to respond to the first mDNS query using a corresponding unicast query response message,
wherein when the instruction to reconfigure the first network is received, reconfiguring the first network controller in the first network to support unicast query and response messages,
wherein the processing resource monitors the first network, the second network and maintains a list of all the connected client devices in the first network and the second network.

17. The method of claim 16, wherein reconfiguring the first network based on the bandwidth difference comprises:
transmitting the bandwidth difference to an external server managed by the network administrator of the first network;
displaying the bandwidth difference on a user interface of the external server;
receiving, at the processing resource, the instruction from the network administrator to reconfigure the first network to unicast the first mDNS query to the first network controller; and
in response to the receiving the instruction, reconfiguring the first network to unicast the first mDNS query to the first network controller.

18. The method of claim 16, wherein the first network and the second network are customer broadcast networks.

19. The method of claim 17, wherein the bandwidth difference is highlighted on the user interface device of the external server based on a percentage difference between the first bandwidth consumption and second bandwidth consumption.

20. The method of claim 16, wherein reconfiguring the first network based on the bandwidth difference comprises:
computing a bandwidth savings of the first network based on the bandwidth difference between the first network and the second network;
transmitting the bandwidth savings as a recommendation to a network device associated with the network administrator of the first network; and
displaying the recommendation on the user interface of the network device.

* * * * *